UNITED STATES PATENT OFFICE.

JOHN WILSON DOUGAL, OF EDINBURGH, SCOTLAND.

FACING OR PRESERVATION OF WALLS AND OTHER SURFACES.

No Drawing. Application filed June 4, 1927, Serial No. 196,627, and in Great Britain December 21, 1925.

This invention relates to the treatment of wall and other surfaces of cement-work, stone, brick, or concrete, with the object of facing, colouring, waterproofing, strengthening, preserving or decorating the surface, without producing a polished hardened surface.

The present invention aims at producing a thin surface film conforming as far as possible to the natural grain or outline of the sandstone, harled or rough cement or other face to which it is applied, thereby preserving the natural appearance of the surface, so that the film will give a renewal in appearance of the object treated.

According to the present invention, a thin surface film is obtained by spraying a dry cementitious powder capable of setting hydraulically into the pores or interstices of the surface under treatment alone or with the addition of an aggregate (other than metallic grains) and preferably with the addition of a colouring matter, the surface treated being sufficiently damp or in a sufficiently damp atmosphere to promote complete hydration and to cause the cement and aggregate to be not merely adherent but chemically bound to and in the pores or interstices of the surface treated, when hydration is complete.

The surface is suitably moistened, if necessary, to retain the applied powder and promote hydration.

The powder consists of Portland cement, lime, or magnesian cement, and silica, brick dust, or other non-metallic aggregate in suitable proportions, with a small quantity of a colouring matter if required.

The powder is applied through a tube and suitable nozzle to the surface by gas pressure, such as by the aid of a current of air supplied under pressure from a compressor, or by revolving fans in an air system, whereby the powder or compound is impinged upon and forced on to and into the surface and its interstices or pores, thereby forming a denser surface.

In the case of cement surfaces, the powder may be sprayed on while the cement is still damp and before the cement has set. The powder will then penetrate into the surface of the damp cement and form an intimate film or skin which becomes firmly incorporated with the cement when it finally sets.

The damping of the surface may be performed by a spray of water or steam vapour and the surface may be hardened by applying a solution in water of sodium silicate or other suitable hardening agents to the wall immediately before or after the powder is applied.

When applied to surfaces of sandstone or like building materials, the powder may be similarly applied to form a cementitious film.

In the selection of a powder or compound for the purpose of colouring the surface, preference is given to such material as will withstand atmospheric action, as well as being unaffected by the constituents of the cement.

As colouring ingredients of the powder, I may employ the oxides or hydrates of suitable mineral earths, such as iron oxide, or the like, according to the colour desired, or the cementitious powder may be combined with any suitable colouring matter.

To aid the setting of the cementitious film applied to the surface, it may be found advantageous to use a hygroscopic substance, either incorporated in a small quantity in the cementitious powder or applied as a solution in water to the surface either before or after the powder is applied. As such hygroscopic substances may be mentioned salts prepared from lime, magnesia or zinc and hydrochloric acid to form chlorides of these bases.

My invention is applicable to either the exterior or interior of stone, brickwork, concrete or cement surfaces, such as the walls, roofs and other surfaces of buildings or to the surfaces of columns, pipes, conduits and the like.

Instead of producing a surface of uniform colour, decorative effects or designs of various colours may be produced, for example, in the form of panels, strips, or circular or diamond-shaped patterns, imprinted by the present process upon surfaces or layers on or of an already-coloured surface. In fact, the process may be carried to the extent of producing wording or other designs for advertisement purposes.

A natural stone or brick appearance may be imparted to the surface treated by this invention by scoring lines to imitate stonework or brickwork before the cement surface has set hard.

Claims:

1. In the treatment of walls or other surfaces of cement work, stone, brick, concrete, or the like, the steps of maintaining the surface in a damp state sufficient to promote complete hydration of a hydraulically setting cement, spraying a dry cementitious powder capable of setting hydraulically thereon, and applying a hardening solution of a soluble silicate to said surface.

2. In the treatment of walls or other surfaces of cement work, stone, brick, concrete, or the like, the steps of maintaining the surface in a damp state sufficient to promote complete hydration of a hydraulically setting cement, spraying a dry cementitious powder capable of setting hydraulically thereon, and applying a solution of a hygroscopic substance to said surface.

3. In the treatment of walls or other surfaces of cement work, stone, brick, concrete, or the like, the steps of maintaining the surface in a damp state sufficient to promote complete hydration of hydraulically setting cement, spraying a dry cementitious powder capable of setting hydraulically thereon, and applying a solution of chloride of lime to said surface.

The foregoing specification signed at Edinburgh, Scotland, this thirteenth day of May, 1927.

JOHN WILSON DOUGAL.